T. L. LEE.
ELECTRIC STARTING AND GENERATING APPARATUS.
APPLICATION FILED MAY 15, 1915.
1,231,753.
Patented July 3, 1917.
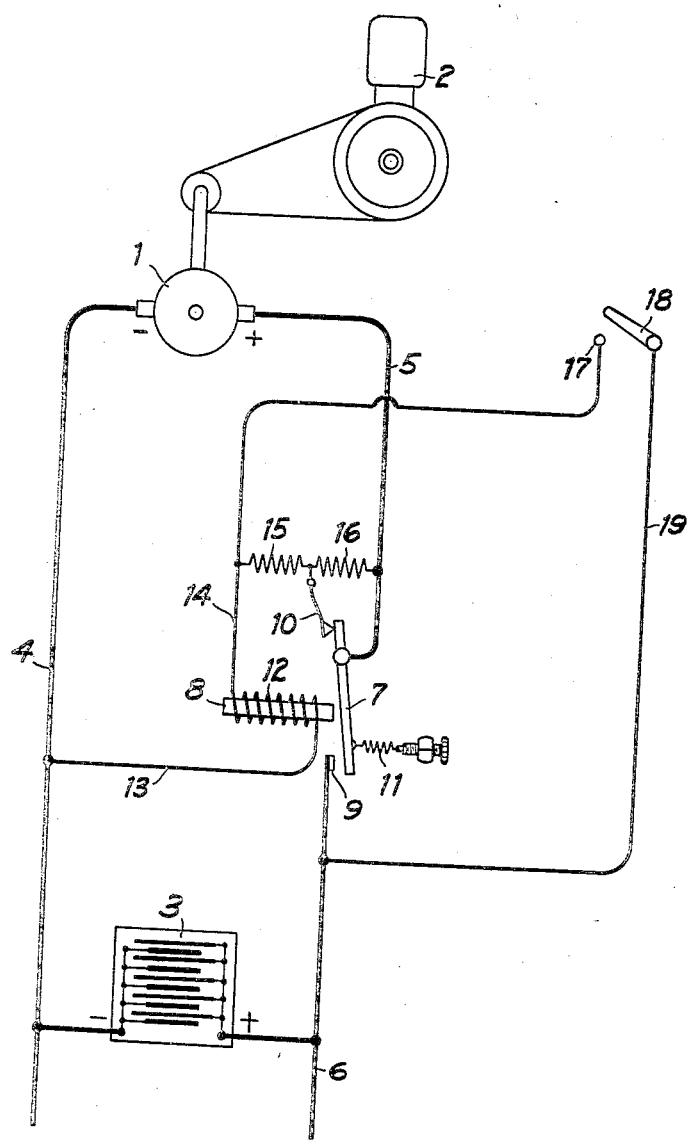
Inventor:
Thomas L. Lee
by his attorneys
Davis & Dorsey

UNITED STATES PATENT OFFICE.

THOMAS L. LEE, OF ROCHESTER, NEW YORK, ASSIGNOR TO NORTH EAST ELECTRIC COMPANY, OF ROCHESTER, NEW YORK, A CORPORATION OF NEW YORK.

ELECTRIC STARTING AND GENERATING APPARATUS.

1,231,753.

Specification of Letters Patent.

Patented July 3, 1917.

Application filed May 15, 1915. Serial No. 28,448.

*To all whom it may concern:*

Be it known that I, THOMAS L. LEE, a citizen of the United States, and resident of Rochester, in the county of Monroe and State of New York, have invented certain new and useful Improvements in Electric Starting and Generating Apparatus, of which the following is a specification.

This invention relates to electric apparatus such as is employed in connection with motor-vehicles driven by internal-combustion engines, for the purpose of starting such engines by the power of an electric motor energized by a storage-battery, and for thereafter recharging the battery and generating electricity for various purposes; particularly to systems of what is usually described as the "single-unit" type, that is in which the same dynamo-electric machine is employed alternatively as a motor for starting the engine, and as a generator driven by the engine.

The object of the invention is to simplify and improve apparatus of the type in question with respect to the means by, and the manner in which, the dynamo is thrown into operation as a motor, and the connections between the battery and the dynamo are controlled while the dynamo is operating as a generator.

In accordance with the present invention, the apparatus is so constructed and arranged that the starting-switch does not conduct the current by which the dynamo is energized in the performance of the starting operation. This is accomplished by the use of a relay which controls the main circuit, the starting-switch being arranged to control only the circuit through which the relay-winding is energized. In this manner it is rendered practicable to employ a starting-switch of small size and capacity, which may be connected with the other parts of the apparatus by comparatively long and slender leads, and to locate the starting-switch wherever this may be convenient, as, for example, on the steering column of the vehicle, while at the same time the main current-leads are rendered even shorter and more direct than in the previous arrangement described. In further accordance with the present invention the relay just mentioned is employed also as the automatic cut-out, a single magnetic core, winding and armature being employed to perform the two distinct functions of circuit-closing relay for starting and automatic cut-out for controlling the battery-charging operation.

The accompanying drawing is a diagrammatic representation of apparatus embodying the present invention, associated with an internal-combustion engine.

In the drawing the dynamo-electric machine 1 is illustrated in a conventional manner, and shown as having driving connections with an engine 2. The dynamo is connected with one pole of a storage-battery 3 by means of a main conductor 4, the other pole of the battery being connected with the dynamo through a second main conductor comprising two parts 5 and 6. The relay comprises an armature 7, which constitutes also a contact-member coöperating with a fixed front contact 9, the armature and contact-member being connected, respectively, with the parts 5 and 6 of the second main conductor, so that they control the main circuit between the battery and the dynamo.

The armature 7 also coöperates with a back contact 10, which is shown as comprising a spring, so that it may follow the armature through a part of its movement, for a purpose which will be described later. A spring 11, connected with the armature, tends to move it to, and hold it in, the position shown in the drawing, in which the main circuit is open, while the armature is in engagement with the back-contact 10.

The armature 7 is controlled by a relay-magnet having a core 8 and a winding 12. One end of the winding is connected, by a wire 13, with the first main conductor 4, while the other end of the winding is connected, by a wire 14, with two resistance-devices 15 and 16, the resistance-device 16 being connected with the part 5 of the second main conductor. The back-contact 10 is connected between the two resistance-devices.

The wire 14 extends to a fixed contact-member 17, constituting part of a manually-operable starting-switch, the movable member 18 of the switch being connected, by a wire 19, with the part 6 of the second main conductor.

When the starting-switch is open and the dynamo is not in operation the main circuit is open, at the front-contacts of the relay, and the relay-magnet is deënergized, so that there is no waste of battery energy. When the engine is to be started the starting-switch is closed, and current then flows from the battery through the wire 6 to the wire 19, and thus to the starting-switch. From the starting-switch the current flows, through the wire 14, to the winding 12 of the relay-magnet, and thence back, through the wire 13 and the main conductor 4, to the storage-battery. The path just described is of sufficiently low resistance to permit the current flowing under the E. M. F. of the battery to energize the relay-magnet with a force sufficient to overcome the spring 11 and the reluctance of the air-gap between the magnet and the armature, so that the armature is swung to the left, thus closing the main circuit between the armature and the fixed contact-member 9, so that current from the battery flows through the dynamo, causing it to act as a motor.

When the engine has started the starting-switch may be opened, thus interrupting the connections through which the relay-magnet is energized as just described. If at this time the engine and the dynamo are operating at a speed so low that the dynamo does not generate an E. M. F. greater than a certain predetermined amount, which is substantially greater than the normal battery voltage, the armature is drawn back by the spring 11, thus opening the main circuit. At this time, however, the current generated by the dynamo flows through the wire 5 to the armature 7, and thence, through the back-contact 10 and the resistance-device 15, to the wire 14, and this current passes through the magnet-winding 12 and back, by way of the wire 13 and the main-conductor 4, to the dynamo. As soon, therefore, as the generator has attained an E. M. F. of the predetermined amount, this being regulated by the resistance-device 16 and the spring 11, the armature is again attracted by the relay-magnet, thus closing the main circuit and permitting the dynamo to recharge the battery.

When the armature is attracted by the magnet as just described the diminution of the air-gap between the magnet and the armature tends to substantially diminish the amount of current required to hold the armature. The resistance-device 16 is employed to counteract this effect, for when the armature is in its left-hand position it is disengaged from the back-contact 10, and therefore the current from the dynamo, by which the magnet is energized, must flow through both of the resistance-devices 16 and 15 in the order named.

The resistance-device 15 is employed in order to prevent the occurrence of a circuit of low resistance through which current may flow, from the battery, through the connections including the starting-switch and through the dynamo, when the starting-switch is closed to start the engine. Both of the resistance-devices should be non-inductive in character, in order to avoid sparking at the contact-points.

The back-contact 10 is spring-mounted in order that it may follow the armature through the first part of its movement toward the relay-magnet, so as not to break the shunt-circuit around the resistance-device 16 until the air-gap has been sufficiently diminished to permit the magnet to hold the armature with the diminished current which can pass through the resistance-device.

It will be understood that while the construction and arrangement of the parts above described, and particularly the use of resistances controlled by the relay-armature, constitute the best means for carrying out the present invention which I have as yet devised, the invention is not limited to the embodiment described, but may be embodied in various other forms within the nature of the invention as it is defined in the following claims.

I claim:—

1. In combination with a dynamo-electric machine and a storage-battery; a relay comprising contact-members biased to open-circuit position, and a magnet controlling the contact-members; main conductors connecting the dynamo and the battery in circuit, the contact-members being interposed in one main conductor; a connection between the other main conductor and one terminal of the winding of the relay-magnet; a resistance-device connected in series with the other terminal of said winding and that part of the first main conductor which is between the dynamo and the contact-devices; a switch; a connection between one terminal of the switch and the connected terminals of the magnet-winding and the resistance-device; and a connection between the other switch-terminal and that part of the first main conductor which is between the contact-members and the battery.

2. In combination with a dynamo-electric machine and a storage-battery, a relay; conductors connecting the dynamo and the battery in a main circuit through the relay-contacts but independently of the relay-winding; low-resistance connections between the relay-winding and the main circuit, for energizing the relay by current from the battery when the dynamo is to be used as a motor; a switch controlling said connections; and connections between the relay-winding and the main circuit, for energizing the magnet by current from the dynamo when the dynamo is in use as a generator, the last-mentioned connections including resistance sufficient to prevent operation of the relay under the battery-voltage alone.

3. In combination with a dynamo-electric machine and a storage-battery, and conductors connecting them in a main circuit;

a relay-magnet; connections, between the winding of the relay-magnet and the main circuit, for energizing the relay by current from the battery when the dynamo is to be used as a motor; a switch controlling said connections; high-resistance connections, between the winding of the relay-magnet and the main circuit, for energizing the magnet by current from the dynamo when it is in use as a generator; contact-members controlled by the relay-magnet and controlling the main circuit, said contact-members being biased to open-circuit position; contact-members controlled by the relay-magnet and biased to closed-circuit position; and connections, between the last-mentioned contact members and said high-resistance connections, for short-circuiting a part only of the resistance when the main circuit is open.

4. In combination with a dynamo-electric machine and a storage-battery, a relay having front-contacts and back-contacts; main conductors connecting the dynamo and the battery in circuit, the front-contacts of the relay being interposed in one main conductor; a connection between the other main conductor and one terminal of the relay-winding; a high-resistance connection between the other terminal of said winding and that part of the first main conductor which is between the dynamo and the front-contacts; connections, including a starting-switch, between the second-mentioned terminal of the relay-winding and the part of the first main conductor which is between the battery and the front-contacts; and a short-circuit, controlled by the back-contacts of the relay, about a part only of said high-resistance connection.

THOMAS L. LEE.